US006970983B1

(12) United States Patent
Huang et al.

(10) Patent No.: US 6,970,983 B1
(45) Date of Patent: Nov. 29, 2005

(54) MULTIPLE PORT SYSTEM AND METHOD FOR CONTROLLING THE SAME

(75) Inventors: Shih-Hsing Huang, San Jose, CA (US); Narayanan Raman, Milpitas, CA (US)

(73) Assignee: LSI Logic Corporation, Milpitas, CA (US)

( * ) Notice: Subject to any disclaimer, the term of this patent is extended or adjusted under 35 U.S.C. 154(b) by 272 days.

(21) Appl. No.: 10/282,632

(22) Filed: Oct. 28, 2002

(51) Int. Cl.[7] .............................................. G06F 12/00
(52) U.S. Cl. .............................. 711/149; 711/1; 711/2; 370/392
(58) Field of Search ........................ 711/1–2, 149–152, 711/154, 163, 167, 5, 100–105, 156; 370/261, 370/252, 392, 422, 395.72; 710/5, 38, 110, 710/305, 316

(56) References Cited

U.S. PATENT DOCUMENTS 4,797,877 A * 1/1989 Pope et al. ................. 370/261
5,784,003 A * 7/1998 Dahlgren .................... 340/2.2
5,802,052 A * 9/1998 Venkataraman ........ 370/395.72
6,011,799 A * 1/2000 Kerstein et al. ............ 370/422
6,205,493 B1 * 3/2001 Dreyer et al. .................. 710/5
6,389,480 B1 * 5/2002 Kotzur et al. ............... 709/249
6,697,887 B1 * 2/2004 Acharya ...................... 710/38

OTHER PUBLICATIONS

"Etherent PHY-110 Core", DB08-000181-00 Mar. 2002, pp. 1-17.

* cited by examiner

*Primary Examiner*—Donald Sparks
*Assistant Examiner*—Hashem Farrokh
(74) *Attorney, Agent, or Firm*—Thelen Reid & Priest LLP

(57) ABSTRACT

A multiple port system includes a plurality of port devices, each port device including a control register set, and a control bus coupled to the plurality of port devices. The control bus provides a control signal to each port device, and the control signal includes port address information and register address information. The control register set includes a set of registers responsive to the control signal if the port address information indicates the corresponding port device, and a designated register responsive to the control signal if the port address information indicates one of the plurality of the port devices and the register address information indicates the designated register.

25 Claims, 3 Drawing Sheets

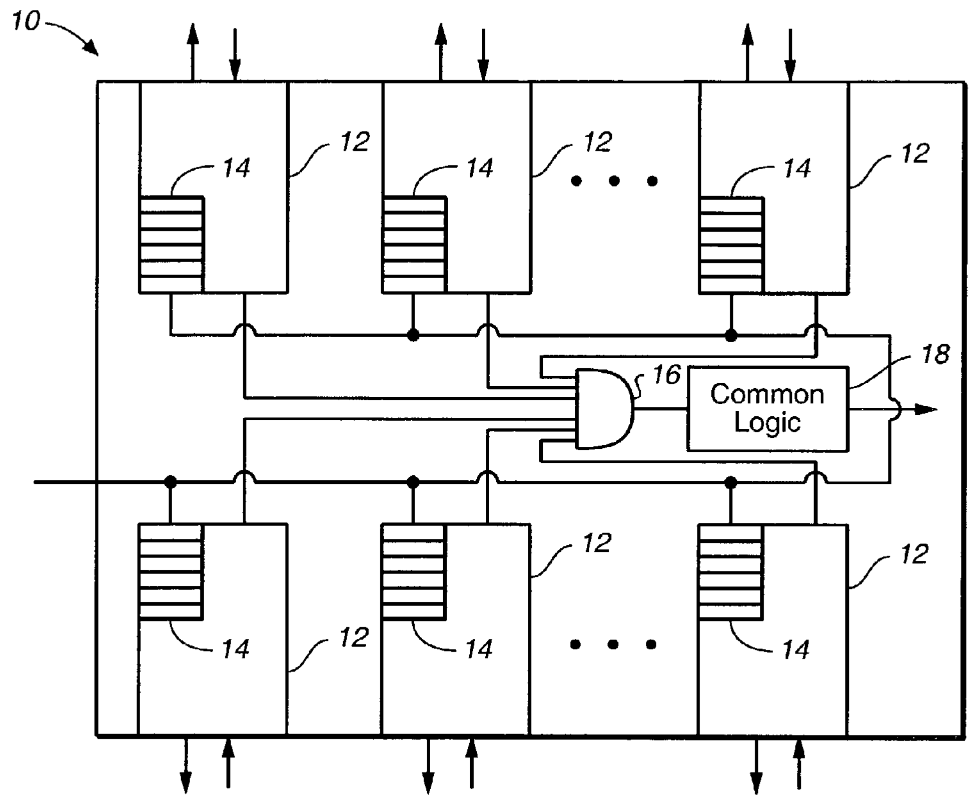
FIG._1 (PRIOR ART)
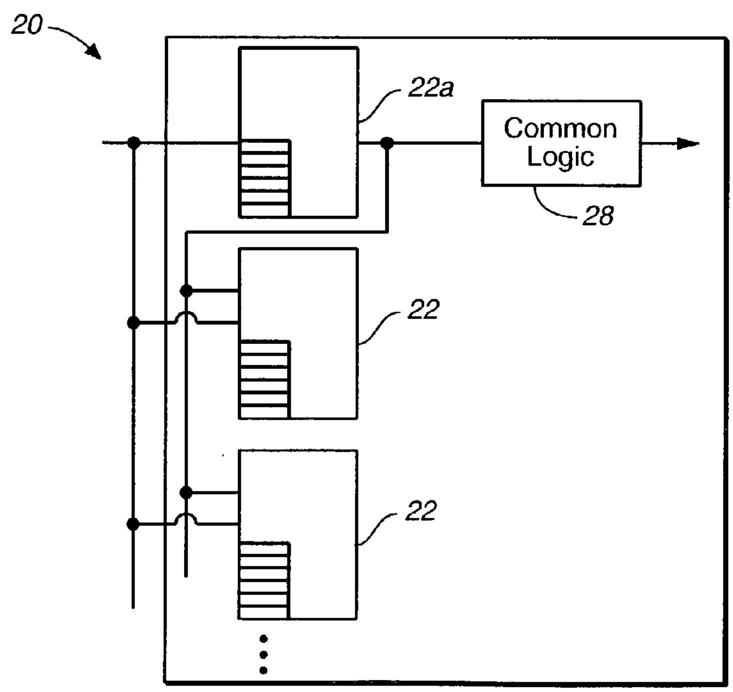
FIG._2 (PRIOR ART)

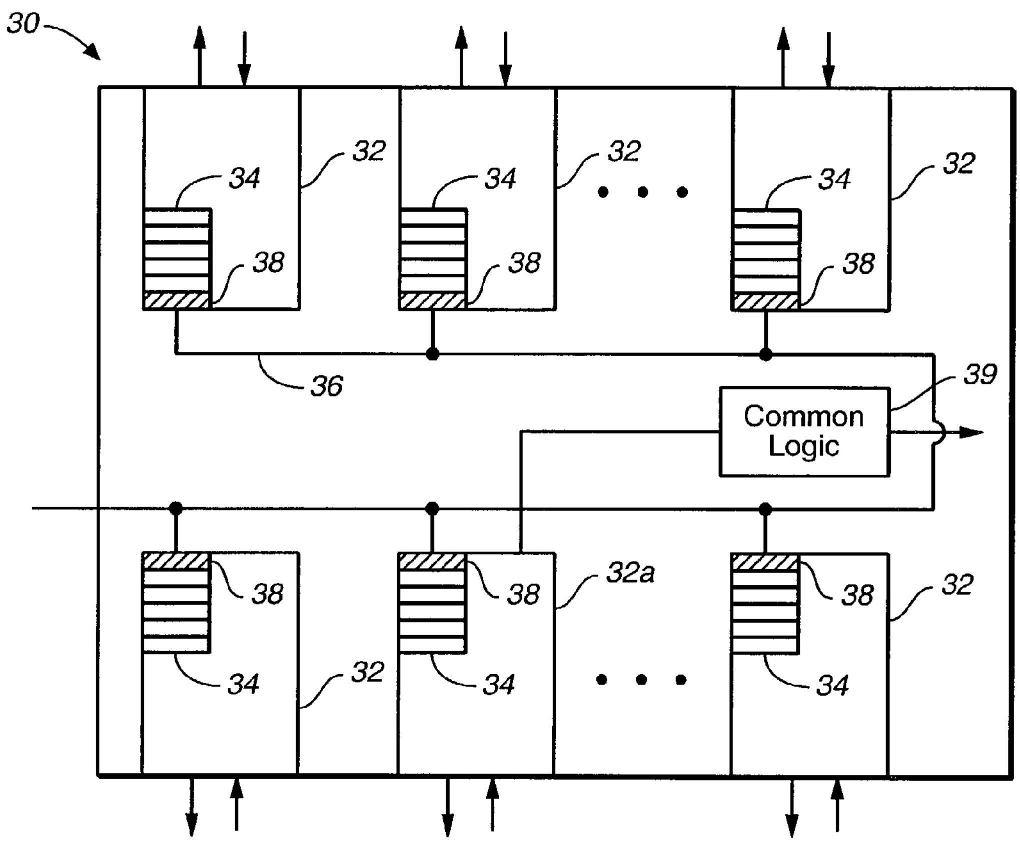
FIG._3
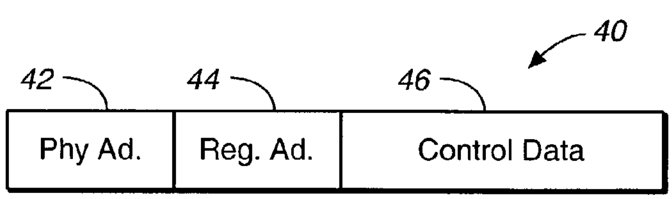
FIG._4

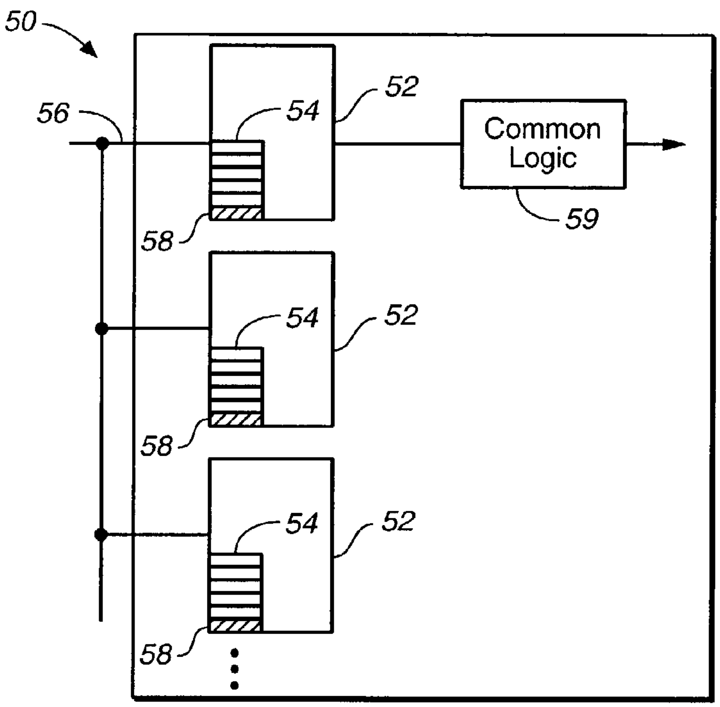
FIG._5
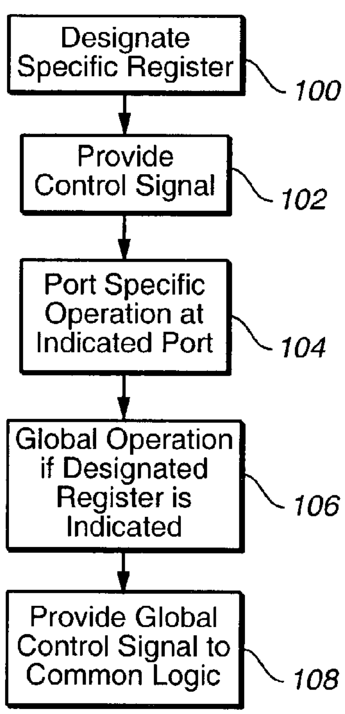
FIG._6
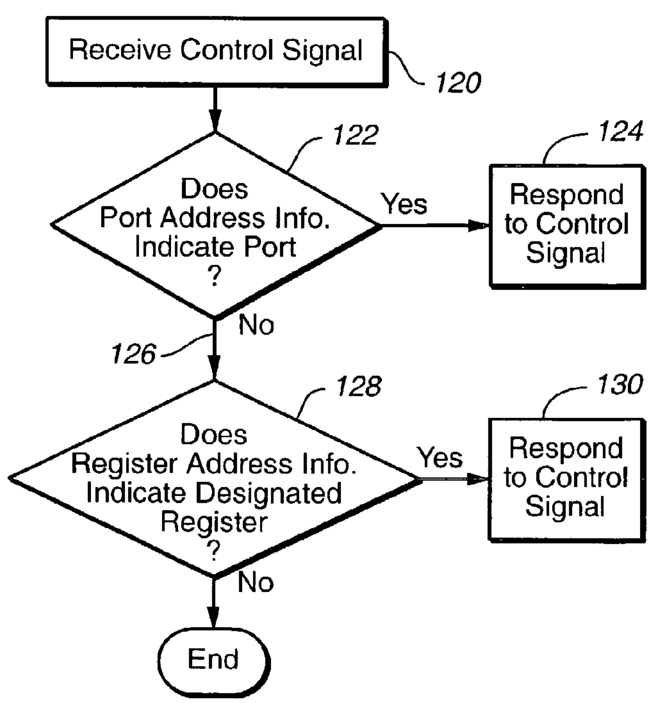
FIG._7

MULTIPLE PORT SYSTEM AND METHOD FOR CONTROLLING THE SAME

FIELD OF THE INVENTION

The present invention relates to a multiple port system. More particularly, the present invention relates to a system and method for controlling a multiple port system including a control register set.

BACKGROUND OF THE INVENTION

FIG. 1 schematically illustrates a conventional multiple port system 10 including a plurality of port devices 12. The multiple port system 10 may be used in an application specific integrate circuit (ASIC) design requiring the use of such multiple ports or in a multi-port Application Specific Standard Product (ASSP), for example, in a network interface chip or network interface card. Each port device 12 may be an individual channel core provided in a multiple-channel application of a system-on-chip design. Each of the port devices 12 is identical, and includes its own set of registers (control register set) 14 for configuration and control. Each port device 12 is also referred to as an instance of the identical port, which is instantiated multiple times in a cycle if the system requires.

The control register set 14 is accessible over an industry standard interface and is controlled using control signals having a management frame. For example, if an individual port device needs to be reset, a corresponding bit set is written to the registers in order to initiate a reset operation. Similarly, there are other functions such as "power down" that can be controlled by writing to the respective register bit. This conventional method works fine when the control needs to be done on a "per-port" basis. However, there may be situations where all the ports in the device (ASIC or ASSP) need to be reset simultaneously. There are several ways to achieve such a simultaneous or global control.

One way of implementing a global control is to provide a piece of logic such as an AND gate 16 that monitors the reset signal from each of the ports 12, as shown in FIG. 1. The logic 16 generates a master reset signal when all the reset signals for the ports are active, resetting common logic 18. The drawback of this approach is that a master device (not shown) that provides control signals to the multiple ports needs to write the corresponding register bit in the register set 14 for each port 12. That is, all instances of the port need to be reset to initiate a global reset of the multiple port system 10. This involves a number of write operations to the system 10. Typically, software is used to write the register bits of the individual ports 12, and the software may not be able to complete the write operation to multiple ports within the time period for a single port to come out of reset. The AND logic 16 will work as long as all the ports 12 are in reset at the same time. However, if the first port that was reset completes its reset cycle before the last port is reset, then the AND logic 16 will not be able to perform a global reset. This is a deficiency of the AND logic approach, which becomes more conspicuous as the number of ports increases.

FIG. 2 schematically illustrates a conventional multiple port system 20 employing another approach to the global control. In this approach, a reset signal from one of the ports (port 22*a*) is considered as an equivalent of a master reset signal, and is used to reset all the ports 22 (and the common logic 28) in case of a system reset. The advantage of this approach is that it does not require monitoring all the individual reset signals from the multiple ports. However, it is impossible to reset the port 22*a* that is being used as the master reset without placing the entire system into reset. Thus, when the port 22*a* need to be reset, the entire system 20 must also be reset. Such a reset operation is not desirable.

Accordingly, it would be desirable to provide a system and method that implement global signals in a multiple-port circuit design in a scalable manner.

BRIEF DESCRIPTION OF THE INVENTION

A multiple port system includes a plurality of port devices, each port device including a control register set, and a control bus coupled to the plurality of port devices. The control bus provides a control signal to each port device, and the control signal includes port address information and register address information. The control register set includes a set of registers responsive to the control signal if the port address information indicates the corresponding port device, and a designated register responsive to the control signal if the port address information indicates one of the plurality of the port devices and the register address information indicates the designated register.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 1 is a block diagram schematically illustrating an example of a conventional multiple port system including a plurality of port devices.

FIG. 2 is a block diagram schematically illustrating another example of a conventional multiple port system including a plurality of port devices.

FIG. 3 is a block diagram schematically illustrating a multiple port system in accordance with one embodiment of the present invention.

FIG. 4 is a diagram schematically illustrating an example of a management frame in a control signal.

FIG. 5 is a block diagram schematically illustrating a multiple port system in accordance with one embodiment of the present invention.

FIG. 6 is a process flow diagram schematically illustrating a method for controlling a multiple port system in accordance with one embodiment of the present invention.

FIG. 7 is a process flow diagram schematically illustrating an example of control operation at one port device in a multiple port system in accordance with one embodiment of the present invention.

DETAILED DESCRIPTION

Embodiments of the present invention are described herein in the context of a multiple port system and a method for controlling the same. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

FIG. 3 schematically illustrates a multiple port system 30 in accordance with one embodiment of the present invention. The multiple port system 30 includes a plurality of port devices 32. Each of the port devices 32 is identical, and includes a control register set 34. For example, the port devices 32 may be physical layer devices or transceivers, such as PHY-110 core, available from LSI Logic Corporation of Milpitas, Calif. The multiple port system 30 also includes a control bus 36 coupled to each of the port devices 32. The control bus 36 provides a control signal to each port device 36. In addition, the multiple port system 30 may also include a common logic circuit 39 coupled to one of the port devices 32.

The multiple port system 30 may be implemented as an ASIC or ASSP and used in a network interface chip, network interface card, and the like. Each port device 32 may be an individual channel core provided in a multiple-channel application of a system-on-chip design. Each port device 32 is also referred to as an instance of the identical port, which is instantiated multiple times in a cycle if the system requires.

The control register set 34 is typically used for configuration and control of the respective port device 32. The control register set 34 is accessible over an industry standard interface and is controlled using control signals supplied via the control bus 36. A control signal includes port address information and register address information, typically in the form of a management frame. FIG. 4 schematically illustrates an example of a management frame 40. As shown in FIG. 4, the management frame 40 may include a port address (physical layer address) 42, a register address 44, and control data 46. For example, the port address 42, the register address 44, and the control data 46 may have the size of 5 bits, 5 bits, and 16 bits, respectively. However, these bit numbers are depends on the number of the port devices 32, the number of the registers included in the control register set 34, and the size of the control data (or register bits to be written).

In accordance with one embodiment of the present invention, one of the registers in each of the control register set 34 is designated as a specific "global" register. That is, referring back to FIG. 3, the control register set 34 includes a set of registers and a designated register 38. The set of (non-designated) registers are responsive to a control signal if the port address information of the control signal indicates the corresponding port device 32. The designated register 38 is responsive to a control signal if the port address information indicates one of the port devices 32 and the register address information indicates the designated register 38. For example, if the control register set 34 includes 32 registers, a specific register address (for example, "11111") may be allocated to the designated register 38. However, the number of the registers and the location of the designated register 38 in the register set 34 may be different depending on a selected application and implementation.

In accordance with one embodiment of the present invention, local (port-specific) control signals and global (inter-port) control signals are implemented using the same control signal scheme without the need of extra logic. A local control signal includes the port address information indicating a specific port, and the register address information indicating one of the non-designated registers. Thus, when the port devices 32 receive a local control signal, only one specific port device 32 responds to the control signal and the control data is written to the addressed register in that port device 32. A global control signal includes the port address information indicating one of the port devices 32, and the register address information indicating the designated register 38. Thus, when the port devices 32 receive the global control signal, all of the port devices 32 respond to the control signal, and the control data is written to the designated register 38 in all of the port devices 32.

Since all of the port devices 32 are in the identical state when the global signal is applied thereto, only one of the port devices 32 (for example, the port device 32*a*) is coupled to the common logic 39 and sends the information of the global port status thereto. Compared with the conventional design (the multiple port system 10 shown in FIG. 1), the extra logic 16 and corresponding signal lines are eliminated.

FIG. 5 schematically illustrates a multiple port system 50 in accordance with one embodiment of the present invention. The multiple port system 50 includes a plurality of port devices 52, each of which includes a control register set 54. The multiple port system 50 also includes a control bus 56 coupled to each of the port devices 52. The control bus 56 provides a control signal to each port device 56. In addition, the multiple port system 50 may also include a common logic circuit 59 coupled to one of the port devices 52. Compared with the corresponding conventional design (the multiple port system 20 shown in FIG. 2), the global signal can be implemented without using one of the port devices as a master device for global control (for example, master reset device).

FIG. 6 schematically illustrates a method for controlling a multiple port system in accordance with one embodiment of the present invention. The multiple port system includes a plurality of port devices, and each port device includes a control register set. Such a multiple port system may be the multiple port system 30 or 50 described above. First, a specific register in the control register set is designated in each port device (100). A control signal is provided to each port device (102). The control signal includes port address information and register address information. At a port device indicated by the port address information, an operation is performed, in response to the control signal, to a register indicated by the register address information (104). This is typically a port-specific operation. If the port address information indicates one of the port devices and the register address information indicates the designated register, an operation is performed to the designated register at each port device in response to the control signal (106). This is a global control operation performed at each of the port devices initiated by the same control signal. For example, such a global operation includes a global reset (reset of the entire multiple port system), change of performance mode (such as a low-power mode), and the like. The global control signal may be provided to common logic of the multiple port system from one of the port devices in response to an operation to the designated register of the port device (108).

It should be noted that since the global control signal has the port address information indicating one of the port devices, that one specific port device responses to the global control signal as if it is a port-specific control signal. However, since the register address information indicates the designated register, the same control data is written to the designated register so as to perform the global operation in the same manner as other port devices.

FIG. 7 schematically illustrates an example of control operation at one port device in a multiple port system in accordance with one embodiment of the present invention. A port receives a control signal (120). The port device examines the control signal and determines whether the port address information indicates that port device (122). For example, the port address information may be compared with a physical layer address of the port device. If the port address information matches the physical layer address of the port device, the port device responds to the control signal (124). For example, the control data is written to a register which is indicated by the register address information.

If the port address information indicates a different port device (126), the port device still examines the register address information, and determines if the register address information indicates the designated register (128). For example, the register address information is compared with a specific register address of the designated register. If the register address information matches the specific register address, an operation (i.e., a global operation) is performed to the designated register (130). If the register address information does not match the specific register address, the control signal may be discard or ignored.

As described above, the global control signals are implemented in such a way that it does not require external logic when the each port device (core) is instantiated multiple times. One of the registers is considered to be a global register. For example, in a normal write cycle to a register of the control register set, each port device monitors the port address and register address of the control signal before it responds to the control signal and perform an operation. The designated register (global register) is an exception. That is, if the port device sees the global register address during the write cycle, then it accepts the write operation even if the port address does not match its own port address. In the case of the reset operation, for example, this implementation eliminates the need of extra logic for monitoring individual reset signals from multiple ports is eliminated, as well as the need to perform a write operation to each port to set the individual reset bits in order to initiate a global reset operation.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A multiple port system comprising:

a plurality of port devices, each port device including a control register set; and a control bus coupled to the plurality of port devices, the control bus providing a control signal to each port device, the control signal including port address information and register address information, wherein the control register set includes:

a set of registers responsive to the control signal if the port address information indicates the corresponding port device; and a designated register responsive to the control signal if the port address information indicates one of the plurality of the port devices and the register address information indicates the designated register, and wherein each port device determines whether the port address information indicates the port device, and further determines whether the register address information indicates the designated register, if the port address information indicates a different port device.

2. A system in accordance with claim 1 wherein the control signal includes:

a local control signal having the register address information indicating one of said set of the registers; and a global control signal having the register address information indicating said designated register.

3. A system in accordance with claim 1 wherein the control signal includes a management frame.

4. A system in accordance with claim 3 wherein the management frame includes a port address, a register address, and control data.

5. A system in accordance with claim 1 wherein each port device includes a physical layer device.

6. A system in accordance with claim 1 wherein each port device includes a transceiver device.

7. A system in accordance with claim 1, further comprising:

a common logic circuit coupled to one of said plurality of port devices.

8. A method for controlling a multiple port system, the system including a plurality of port devices, each port device including a control register set, said method comprising:

designating a specific register in the control register set in each port device;

providing a control signal to each port device, the control signal including port address information and register address information;

performing, at a port device indicated by the port address information, an operation to a register indicated by the register address information in response to the control signal;

performing, at each port device in response to the control signal, an operation to the designated register if the port address information indicates one of the plurality of port devices and the register address information indicates the designated register;

determining, at each port device, whether the port address information indicates the port device; and determining, at each port device, whether the register address information indicates the designated register, if the port address information indicates a different port device.

9. A method in accordance with claim 8 wherein said determining the port address includes:

comparing the port address information with a physical layer address of the port device.

10. A method in accordance with claim 8 wherein said determining the register address includes:

comparing the register address information with a specific address of the designated register.

11. A method in accordance with claim 8 wherein the control signal includes a management frame.

12. A method in accordance with claim 11 wherein the management frame includes a port address, a register address, and control data.

13. A method in accordance with claim 12 wherein said performing an operation includes:

writing the control data to the corresponding register.

14. A method in accordance with claim 8 wherein each port device includes a physical layer device.

15. A method in accordance with claim 8 wherein each port device includes a transceiver device.

16. A method in accordance with claim 8 wherein the multiple port system includes common logic, said method further comprising;

providing a global control signal to the common logic from one of the port devices in response to an operation to the designated register of the port device.

17. An apparatus for controlling a multiple port system, the system including a plurality of port devices, each port device including a control register set, said apparatus comprising:

means for designating a specific register in the control register set in each port device;

means for providing a control signal to each port device, the control signal including port address information and register address information;

means for performing, at a port device indicated by the port address information, an operation to a register indicated by the register address information in response to the control signal;

means for performing, at each port device in response to the control signal, an operation to the designated register if the port address information indicates one of the plurality of port devices and the register address information indicates the designated register;

means for determining, at each port device, whether the port address information indicates the port device: and means for determining, at each port device, whether the register address information indicates the designated register, if the port address information indicates a different port device.

18. An apparatus in accordance with claim 17 wherein said means for determining the port address includes:

means for comparing the port address information with a physical layer address of the port device.

19. An apparatus in accordance with claim 17 wherein said means for determining the register address includes:

means for comparing the register address information with a specific address of the designated register.

20. An apparatus in accordance with claim 17 wherein the control signal includes a management frame.

21. An apparatus in accordance with claim 20 wherein the management frame includes a port address, a register address, and control data.

22. An apparatus in accordance with claim 21 wherein said means for performing an operation includes:

means for writing the control data to the corresponding register.

23. An apparatus in accordance with claim 17 wherein each port device includes a physical layer device.

24. An apparatus in accordance with claim 17 wherein each port device includes a transceiver device.

25. An apparatus in accordance with claim 17 wherein the multiple port system includes common logic, said apparatus further comprising;

means for providing a global control signal to the common logic from one of the port devices in response to an operation to the designated register of the port device.

* * * * *